(12) United States Patent
Kato (10) Patent No.: US 6,469,818 B1
(45) Date of Patent: Oct. 22, 2002

(54) MULTI-BEAM SCANNING OPTICAL APPARATUS AND IMAGE FORMING APPARATUS USING IT

(75) Inventor: Manabu Kato, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/675,146

(22) Filed: Sep. 29, 2000

(30) Foreign Application Priority Data

Oct. 6, 1999 (JP) .......................................... 11-285315

(51) Int. Cl.$^7$ .............................................. G02B 26/08
(52) U.S. Cl. ..................... 359/204; 359/205; 359/207; 359/216; 347/235; 347/243; 347/244; 250/235
(58) Field of Search .......................... 359/204, 205–207, 359/19, 563, 566; 250/234–236; 347/233, 235, 243, 244

(56) References Cited

U.S. PATENT DOCUMENTS

| | | | |
|---|---|---|---|
| 4,806,951 A | * | 2/1989 | Arimoto et al. |
| 4,864,419 A | | 9/1989 | Saito et al. |
| 5,182,575 A | | 1/1993 | Kato et al. |
| 5,436,645 A | | 7/1995 | Uemura et al. |
| 5,557,446 A | | 9/1996 | Kato |
| 5,963,356 A | | 10/1999 | Kato |
| 5,966,161 A | | 10/1999 | Kato |
| 5,995,131 A | | 11/1999 | Fujibayashi et al. |
| 6,038,053 A | | 3/2000 | Kato |
| 6,094,286 A | | 7/2000 | Kato |
| 6,133,935 A | | 10/2000 | Kujibayashi et al. |

FOREIGN PATENT DOCUMENTS

JP        3-57453        2/1991

\* cited by examiner

*Primary Examiner*—James Phan
(74) *Attorney, Agent, or Firm*—Fitzpatrick, Cella, Harper & Scinto (57) ABSTRACT

Provided are a multi-beam scanning optical apparatus capable of realizing compactification of a synchronism-detecting optical system and high-accuracy synchronism detection based on prevention of spatial overlap between spots, and an image forming apparatus using it. The multi-beam scanning optical apparatus is constructed in such structure that a plurality of beams independently optically modulated and emitted from a light source having a plurality of light emission points placed with a spacing in the main scanning direction are focused in a spot shape on a surface to be scanned, via a deflecting element by a scanning optical element, the plurality of beams scan an area on the surface to be scanned, part of the plurality of beams via the deflecting element are converged in a spot shape at a synchronism detection position and thereafter guided onto a surface of a synchronism detecting element, and timing of scan start position on the surface to be scanned is controlled for each of the plurality of beams by use of a signal from the synchronism detecting element; wherein a spot spacing in the main scanning direction between adjacent beams at the synchronism detection position is smaller than a spot spacing in the main scanning direction between adjacent beams on the surface to be scanned.

21 Claims, 8 Drawing Sheets

MULTI-BEAM SCANNING OPTICAL APPARATUS AND IMAGE FORMING APPARATUS USING IT

BACKGROUND OF THE INVENTION

1. Field of the Invention

The present invention relates to multi-beam scanning optical apparatus and image forming apparatus using it and, particularly, is suitable for image forming apparatus, for example, such as laser beam printers, digital copiers, etc. using the electrophotographic process, constructed to emit a plurality of beams from a light source means provided with a plurality of light emission points (light emitting regions), deflect the beams by a deflecting element, and guide the beams through a scanning optical element having the f-θ characteristic to optically scan an area on a surface to be scanned, thereby recording image information.

2. Related Background Art

In the conventional scanning optical apparatus such as the laser beam printers (LBP), the digital copiers, etc., a plurality of beams optically modulated according to an image signal and emitted from the light source means are periodically deflected by an optical deflector, for example, comprised of a polygon mirror and are converged into a spot shape on a surface of a photosensitive recording medium by the scanning optical element (imaging optical system) having the f-θ characteristic, to optically scan the surface to record the image.

With recent trends toward higher speed and higher resolution of the LBP bodies, dominating scanning optical devices are turning to multi-beam scanning optical devices for simultaneously scanning the area on the recording medium surface with a plurality of beams.

Figure 6:
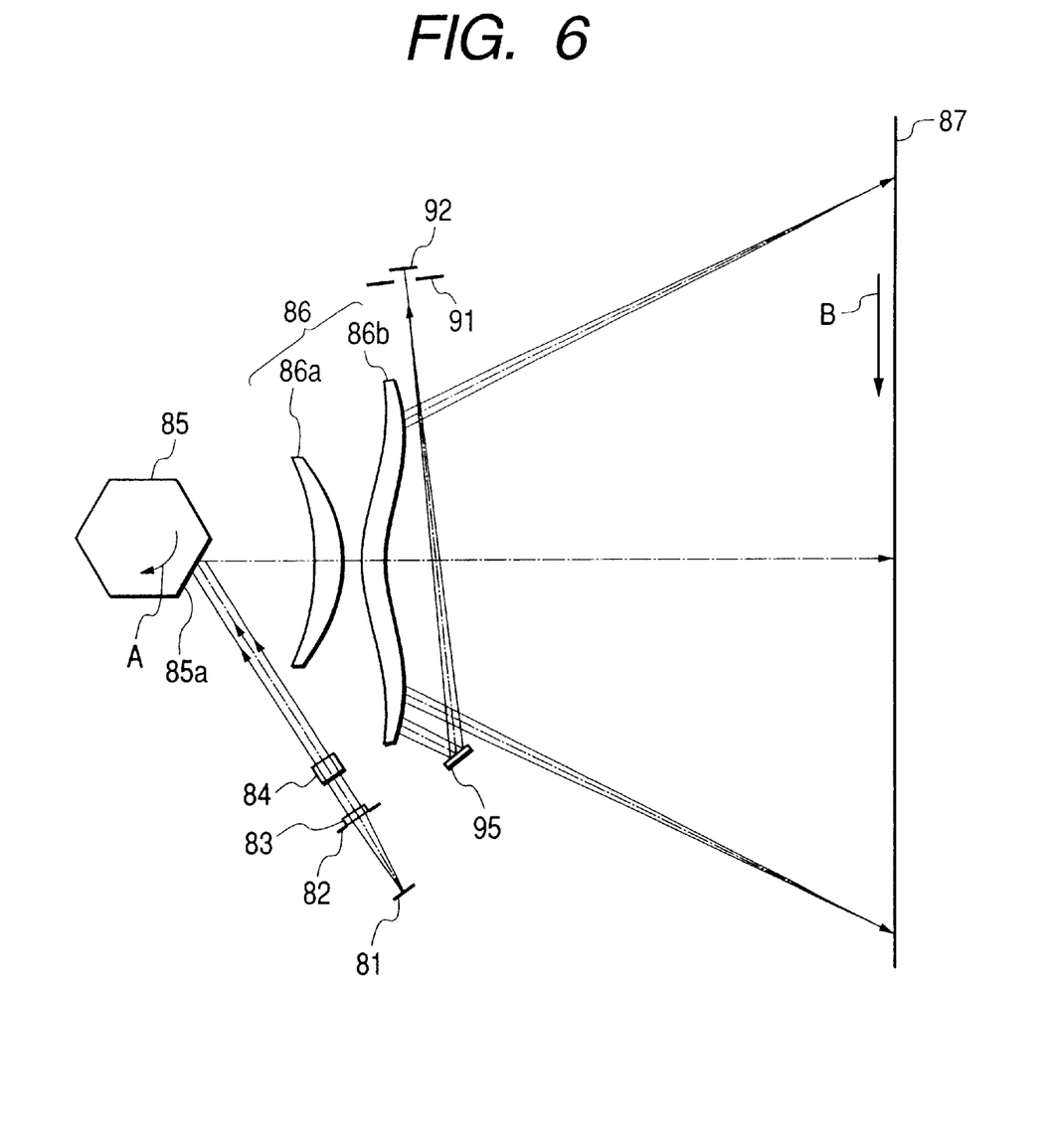
FIG. 6 is a cross-sectional view of the optical system of the conventional scanning optical apparatus in the main scanning direction.

FIG. 6 is a schematic diagram to show the principal part of a conventional multi-beam scanning optical device. In FIG. 6 two diverging beams optically modulated according to image information and emitted from a multi-beam semiconductor laser 81 are limited in the size of their beam section by an aperture stop 82 and are converted into nearly parallel beams or converging beams by a collimator lens 83 to enter a cylindrical lens 84. The beams entering the cylindrical lens 84 emerge therefrom in the same state in the main scanning section. They are converged in the sub-scanning section to be focused as approximately linear images (linear images longitudinal in the main scanning direction) on a deflection facet 85a of the optical deflector 85. Then the two beams reflectively deflected by the deflection facet 85a of the optical deflector 85 are focused in the spot shape on the photosensitive drum surface 87 by the scanning optical element 86. With rotation of the optical deflector 85 in the direction of arrow A, the beams optically scan the area on the photosensitive drum surface 87 at an equal speed in the direction of arrow B (i.e., in the main scanning direction). This causes the image to be recorded on the photosensitive drum surface 87, which is a recording medium.

For adjusting the timing of scan start positions on the photosensitive drum surface 87 before the optical scanning on the photosensitive drum surface 87, part of the two beams reflectively deflected by the optical deflector 85 are guided through the scanning optical element 86 to a BD mirror 95, are reflected thereby to be condensed on a surface of BD slit 91, and thereafter are guided to a BD sensor 92. Then the timing of scan start positions for recording of image on the photosensitive drum surface 87 is adjusted using BD signals obtained by detecting output signals from the BD sensor 92.

Each of the elements of the BD mirror 95, BD slit 91, BD sensor 92, etc. constitutes an element of synchronism detecting means (BD optical system). It is noted that FIG. 6 shows only one of the two beams.

In recent years, there are demands for compact layout of these scanning optical devices with trends toward smaller size of the LBP bodies. Among others, in the case of the multi-beam scanning optical apparatus for implementing simultaneous scanning with two beams, it is desirable that the BD optical system for detecting the write timing of scan start positions in the main scanning direction be complete only in a housing (optical box) to which the deflecting element and the scanning optical element are fixed, and thus there are demands for more compact optical systems.

For example, conceivable methods for realizing the compact BD optical systems include a method of using many return mirrors and bending BD optical paths thereby, a method of decreasing the focal length of the BD optical system in the main scanning direction and thus locating the synchronism detection position at a position extremely before the surface to be scanned, and so on.

Figure 7:
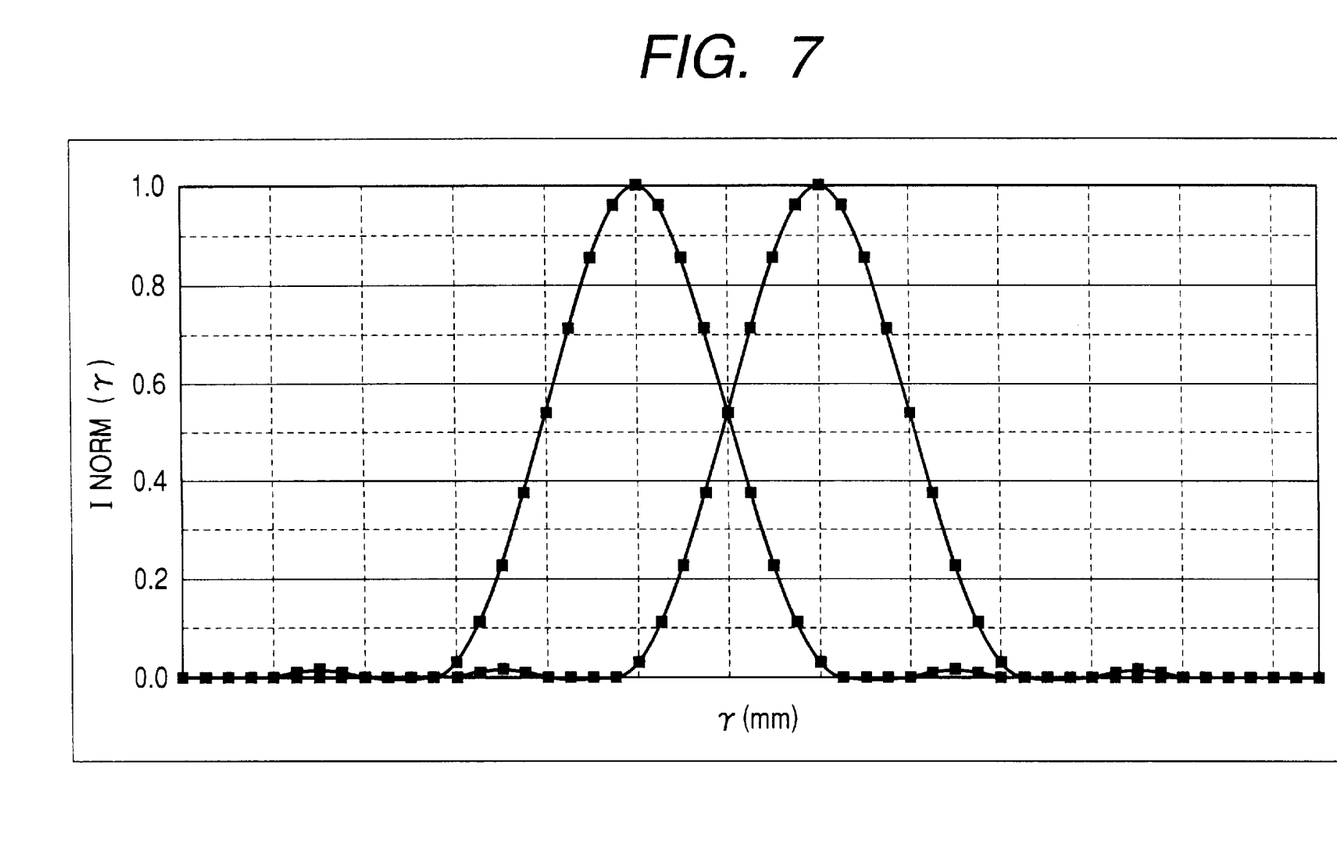
FIG. 7 is a diagram to show separation of spots at the synchronism detection position.

However, the former method uses the many return mirrors and requires adjustment of tilt of the mirrors in the sub-scanning direction for guiding the beams to the BD sensor, posing the problem of high cost. On the other hand, the latter method decreases the image magnification in the main scanning direction between the light source and the BD slit at the synchronism detection position and it is thus difficult to spatially separate the spots of the two beams in the main scanning direction, for example, as illustrated in FIG. 7. Further, the decrease of the image magnification decreases the spot diameter itself, so as to narrow the depth, and thus the spot diameter tends to become larger because of manufacturing errors or the like. This tends to make the spatial separation of the spots more difficult.

If the spots of the two beams overlap at the synchronism detection position (i.e., at the position of the BD slit), a spot profile of one beam will be added to a spot profile of another beam originally to be detected, so as to degrade the accuracy of detection of synchronism in the main scanning direction, posing the problem that jitter appears in the image.

An object of the present invention is to provide a multi-beam scanning optical apparatus wherein a ratio of focal lengths of the scanning optical element and a synchronism-detecting optical element in the main scanning direction is set to an appropriate value, thereby permitting attainment of a compactification of the BD optical system and high accuracy of detection of synchronism based on prevention of spatial overlap between spots by an easy method, and to provide an image forming apparatus using it.

A further object of the present invention is to provide a multi-beam scanning optical apparatus wherein $F_{NO}$ (F number) of plural beams emitted from light source means is set to an appropriate value while keeping the focal length of the synchronism-detecting optical element shorter than the focal length of the scanning optical element in the main scanning direction, thereby spatially separating third dark rings of adjacent spots from each other at the synchronism detection position and permitting attainment of further improvement in the synchronism detection accuracy while maintaining compactness of the BD optical system, and to provide an image forming apparatus using it.

SUMMARY OF THE INVENTION

A multi-beam scanning optical apparatus according to one aspect of the present invention is a multi-beam scanning optical apparatus constructed so that a plurality of beams independently optically modulated and emitted from light source means having a plurality of light emission points placed with a spacing in a main scanning direction are focused in a spot shape on a surface to be scanned, via a deflecting element by a scanning optical element, the plurality of beams scan an area on the surface to be scanned, part of the plurality of beams via the deflecting element are converged in a spot shape at a synchronism detection position and thereafter guided onto a surface of a synchronism detecting element, and timing of scan start position on the surface to be scanned is controlled for each of the plurality of beams by use of a signal from the synchronism detecting element, wherein a spot spacing in the main scanning direction between adjacent beams at the synchronism detection position is smaller than a spot spacing in the main scanning direction between adjacent beams on the surface to be scanned.

A multi-beam scanning optical apparatus according to another aspect of the invention is a multi-beam scanning optical apparatus comprising light source means having a plurality of light emission points which emit a plurality of beams capable of being optically modulated independently and which are placed with a spacing in a main scanning direction; a deflecting element for reflectively deflecting the plurality of beams emitted from the light source means, into the main scanning direction; a scanning optical element for focusing the plurality of beams deflected by the deflecting element, onto a surface to be scanned; and synchronism detecting means for guiding part of the plurality of beams deflected by the deflecting element, via a synchronism-detecting optical element onto a surface of a synchronism detecting element and controlling timing of scan start position on the surface to be scanned, by use of a signal from the synchronism detecting element, wherein the following condition is satisfied:

$$0.02 \text{ (mm)}/L < f_{BD}/f_{SC} < 1.0,$$

where L is a distance in the main scanning direction between adjacent light emission points of the light source means, $f_{SC}$ a focal length in the main scanning direction of the scanning optical element, and $f_{BD}$ a focal length in the main scanning direction of the synchronism-detecting optical element.

In the multi-beam scanning optical apparatus according to another aspect of the invention, said synchronism detecting means controls the timing of scan start position on said surface to be scanned, for each of the plurality of beams emitted from said light source means.

In the multi-beam scanning optical apparatus according to another aspect of the invention, said synchronism-detecting optical element is an anamorphic lens.

In the multi-beam scanning optical apparatus according to another aspect of the invention, said synchronism-detecting optical element is made of a plastic material.

In the multi-beam scanning optical apparatus according to another aspect of the invention, said scanning optical element is made of a plastic material.

In the multi-beam scanning optical apparatus according to another aspect of the invention, said synchronism-detecting optical element and at least one optical element forming said scanning optical element are integrally molded by plastic injection molding. In the multi-beam scanning optical apparatus according to another aspect of the invention, said synchronism-detecting optical element and said second optical element are integrally molded by plastic injection molding.

In the multi-beam scanning optical apparatus according to another aspect of the invention, said scanning optical element comprises a refracting optical element and a diffracting optical element.

In the multi-beam scanning optical apparatus according to another aspect of the invention, said synchronism detecting means is constructed in a plane of reflective deflection effected by said deflecting element.

An image forming apparatus according to one aspect of the invention is an image forming apparatus comprising the scanning optical apparatus as set forth, and a printer controller for converting code data supplied from an external device, into an image signal and entering the image signal into said scanning optical apparatus.

A multi-beam scanning optical apparatus according to a further aspect of the present invention is a multi-beam scanning optical apparatus comprising light source means having a plurality of light emission points which emit a plurality of beams capable of being optically modulated independently and which are placed with a spacing in a main scanning direction; a deflecting element for reflectively deflecting the plurality of beams emitted from the light source means, into the main scanning direction; a scanning optical element for focusing the plurality of beams deflected by the deflecting element, onto a surface to be scanned; and synchronism detecting means for guiding part of the plurality of beams deflected by the deflecting element, via a synchronism-detecting optical element onto a surface of a synchronism detecting element and controlling timing of scan start position on the surface to be scanned, by use of a signal from the synchronism detecting element, wherein the following condition is satisfied:

$$f_{BD}/f_{SC} < 1.0,$$

where $f_{SC}$ is a focal length in the main scanning direction of the scanning optical element and $f_{BD}$ a focal length in the main scanning direction of the synchronism-detecting optical element, and wherein the following condition is also satisfied:

$$Fmi < L/(6.656 \times \lambda) \times f_{BD}/f_{SC},$$

where L is a distance in the main scanning direction between adjacent light emission points of the light source means, λ an oscillation wavelength of the light source means, and Fmi an exit F number in the main scanning direction of the plurality of beams emitted from the light source means.

In the multi-beam scanning optical apparatus according to another aspect of the invention, said synchronism detecting means controls the timing of scan start position on said surface to be scanned, for each of the plurality of beams emitted from said light source means.

In the multi-beam scanning optical apparatus according to another aspect of the invention, said synchronism-detecting optical element is an anamorphic lens.

In the multi-beam scanning optical apparatus according to another aspect of the invention, said synchronism-detecting optical element is made of a plastic material.

In the multi-beam scanning optical apparatus according to another aspect of the invention, said scanning optical element is made of a plastic material.

In the multi-beam scanning optical apparatus according to another aspect of the invention, said synchronism-detecting optical element and at least one optical element forming said scanning optical element are integrally molded by plastic injection molding.

In the multi-beam scanning optical apparatus according to another aspect of the invention, said synchronism-detecting optical element and said second optical element are integrally molded by plastic injection molding.

In the multi-beam scanning optical apparatus according to another aspect of the invention, said scanning optical element comprises a refracting optical element and a diffracting optical element.

In the multi-beam scanning optical apparatus according to another aspect of the invention, said synchronism detecting means is constructed in a plane of reflective deflection effected by said deflecting element.

An image forming apparatus according to still another aspect of the invention is an image forming apparatus comprising the scanning optical apparatus as set forth, and a printer controller for converting code data supplied from an external device, into an image signal and entering the image signal into said scanning optical apparatus.

DETAILED DESCRIPTION OF THE PREFERRED EMBODIMENTS

Embodiment 1

Figure 1A:
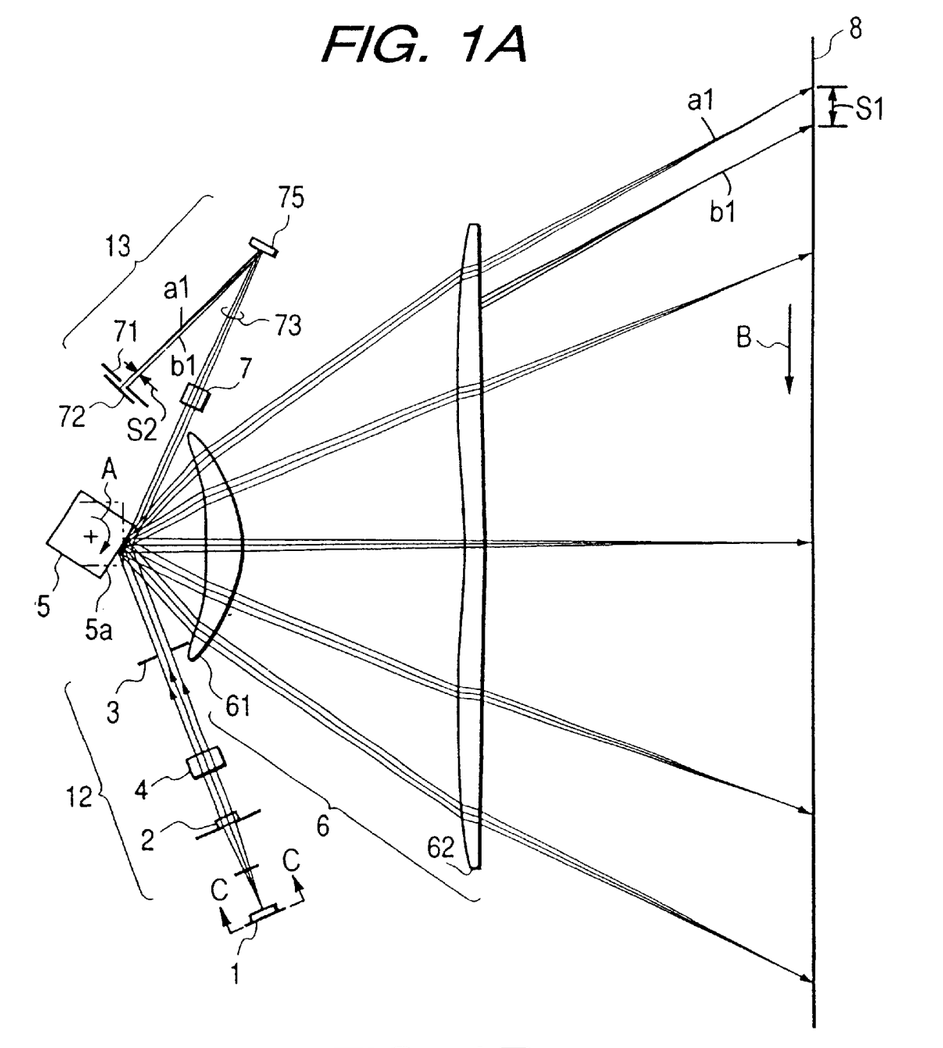
FIG. 1A is a cross-sectional view of Embodiment 1, of the present invention in the main scanning direction.

FIG. 1A is a principal, cross-sectional view in the main scanning direction of Embodiment 1 (main scanning section) where the multi-beam scanning optical apparatus of the present invention is applied to the image forming apparatus such as the laser beam printer, the digital copier, or the like.

In FIG. 1A, numeral 1 designates a light source means having two light emission points a and b (light emitting regions), which is comprised, for example, of a multi-beam semiconductor laser. Numeral 2 denotes a collimator lens as a first optical element, which converts a plurality of beams emitted from the multi-beam semiconductor laser 1, into nearly parallel beams. Numeral 4 represents a cylindrical lens as a second optical element, which has a predetermined refractive power in the sub-scanning section. Numeral 3 indicates an aperture stop, which shapes the size of passing beams. Each of the elements of the collimator lens 2, cylindrical lens 4, aperture stop 3, etc. composes an element of a first optical system 12.

Numeral 5 denotes an optical deflector as a deflecting element, which is comprised, for example, of a polygon mirror (rotary polygon mirror) and which is rotated at a uniform speed in the direction of arrow A in the drawing by a driving means such as a polygon motor or the like (not illustrated).

Numeral 6 designates a scanning optical element (imaging optical system) having the f–θ characteristic and imaging performance, which consists of a refracting optical element 61 and a long diffracting optical element 62. The refracting optical element 61 is comprised of a single, plastic, toric lens with mutually different powers in the main scanning direction and in the sub-scanning direction. In the present embodiment the toric lens 61 is placed on the side of the polygon mirror 5 while the long diffracting optical element 62 on the side of the surface to be scanned 8 with respect to a middle point between the rotation axis of the polygon mirror 5 and the surface to be scanned 8. The long diffracting optical element 62 is made of plastic by injection molding, but it can also be made by forming a diffraction grating on a glass substrate by a replica method, with equivalent effect. Each of these optical elements 61, 62 has different powers in the main scanning direction and in the sub-scanning direction and they focus the deflected beams from the polygon mirror 5 in the spot shape on the surface to be scanned 8 and correct inclination of deflection facets (polygon facets) 5a.

Numeral 8 indicates a photosensitive drum surface (recording medium surface) as a surface to be scanned.

Numeral 7 represents a synchronism-detecting optical element (hereinafter referred to as a "BD lens"), which is comprised of a plastic, anamorphic lens and which focuses a plurality of beams (BD beams) 73 for detection of synchronous signal in the spot shape on a slit surface described hereinafter. Numeral 75 stands for a return mirror for detection of synchronism (hereinafter referred to as a "BD mirror"), which reflects the BD beams 73 for adjustment of the timing of scan start positions on the photosensitive drum surface 8, toward a synchronism detecting element described hereinafter. Numeral 71 denotes a slit for detection of synchronism (hereinafter referred to as a "BD slit"), which determines the write start position of image. Numeral 72 represents a photosensor as a synchronism detecting element (hereinafter referred to as a "BD sensor"), which adjusts the timing of scan start position for recording of image onto the photosensitive drum surface 8 for each of the BD beams 73 by use of a synchronous signal (BD signal) obtained by detecting an output signal from the BD sensor 72 in the present embodiment.

Each of the elements of the BD lens 7, BD mirror 75, BD slit 71, BD sensor 72, etc. composes an element of synchronism detecting means (hereinafter referred to as a "BD optical system") 13. The BD optical system 13 is constructed in the plane of reflective deflection (deflection scanning) effected by the polygon mirror 5.

In the present embodiment two diverging beams, beam a1 and beam b1, emitted from light emission points a and b of the multi-beam semiconductor laser 1 while optically being modulated according to image information are converted into nearly parallel beams by the collimator lens 2 to enter the cylindrical lens 4. For purposes of this description, only beam a1 is depicted in FIG. 1A, with the exception of two short segments of beam b1 adjacent to the photosensitive drum surface 8 and the synchronism detecting means 13. The beams entering the cylindrical lens 4 emerge in the same state therefrom in the main scanning section and then are restricted in the size of beam section by the aperture stop 3. In the sub-scanning section the beams are converged and restricted in the size of beam section by the aperture stop 3 to be focused as approximately linear images (linear images longitudinal in the main scanning direction) on the deflection facet 5a of the polygon mirror 5. The beams reflectively deflected by the deflection facet 5a of the polygon mirror 5 are focused in the spot shape on the photosensitive drum surface 8 by the scanning optical element 6, and with rotation of the polygon mirror 5 in the direction of arrow A, the beams optically scan the area of the photosensitive drum surface 8 at an equal speed in the direction of arrow B (i.e., in the main scanning direction). This causes an image to be recorded on the photosensitive drum surface 8 being a recording medium.

For adjusting the timing of scan start positions on the photosensitive drum surface 8 before the optical scanning thereon, part of the two beams reflectively deflected by the polygon mirror 5 are condensed into the spot shape via the BD mirror 75 onto the surface of the BD slit 71 by the BD lens 7 and thereafter guided to the BD sensor 72. Then the timing of scan start position for recording of image onto the photosensitive drum surface 8 is adjusted for each of the BD beams 73, using the synchronous signal (BD signal) obtained by detecting the output signal from the BD sensor 72.

Now let us discuss conditions for attainment of compactification of the BD optical system 13 and higher accuracy of detection of synchronism based on prevention of spatial overlap between spots.

Figure 1B:
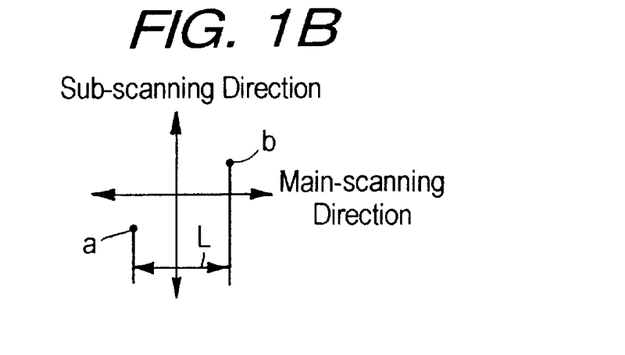
FIG. 1B is a depiction of the positioning of light emission points on a light source according to one embodiment of the invention.

FIG. 1B depicts one example of the positioning of light emission points a and b of the multi-beam semiconductor laser 1 from a cross-sectional perspective taken as indicated by the arrows labeled C. Let L (mm) be the distance in the main scanning direction of the spacing between the adjacent light emission points a and b of the multi-beam semiconductor laser 1 (the distance of a projection of a line segment of the spacing between the adjacent light emission points onto the main scanning section), m be the lateral magnification in the main scanning direction between the multi-beam semiconductor laser 1 and the photosensitive drum surface 8, and $f_{SC}$ (mm) and $f_{BD}$ (mm) be the focal lengths of the scanning optical element 6 and the BD lens 7, respectively, in the main scanning direction. Then the spacing S1 (mm) between the spots of the two adjacent beams a1 and b1 in the main scanning direction on the photosensitive drum surface 8 is given by the following equation.

$$S1 = m \cdot L$$

Further, the spacing S2 (mm) between the adjacent spots formed from beams a1 and b1 in the main scanning direction at the synchronism detection position (i.e., at the position of the BD slit) is given by the following equation.

$$S2 = m \cdot L \times (f_{BD}/f_{SC})$$

In order to prevent the spatial overlap between the adjacent spots at the synchronism detection position, the spots need to be spaced away from each other by at least 0.2 mm or more. Therefore, it is necessary to satisfy the following condition.

$$0.2 < m \cdot L \times (f_{BD}/f_{SC})$$

Taking the potential range of lateral magnification in the main scanning direction of the ordinary multi-beam scanning optical apparatus into consideration, m ≦ 10. Therefore, the following is derived from the above condition.

$$0.02/L < f_{BD}/f_{SC}$$

Let us next discuss the compactification of the BD optical system 13.

When the BD beams are focused via the scanning optical element by the synchronism-detecting optical element as in the conventional example, the focal lengths of the two elements are equal in the main scanning direction, so that the synchronism detection position needs to be set at the position optically equivalent to the surface to be scanned.

In this embodiment the compactification of the BD optical system 13 is achieved by making the focal length $f_{BD}$ of the BD lens 7 smaller than the focal length $f_{SC}$ of the scanning optical element 6 in the main scanning direction, i.e., by satisfying the following condition (1).

$$f_{BD}/f_{SC} < 1.0 \qquad (1)$$

It is seen from the above that the ratio of the focal lengths $f_{BD}$, $f_{SC}$ of the two elements needs to be set so as to satisfy the following condition in order to attain the layout for realizing both the compactification of the BD optical system 13 and the higher accuracy of detection of synchronism based on the prevention of spatial overlap between spots.

$$0.02 \text{ (mm)}/L < f_{BD}/f_{SC} < 1.0 \qquad (2)$$

Table 1 presents set values of the optical layout of the BD optical system 13 in the present embodiment.

TABLE 1

| Setup of BD optical system | Radius of curvature (mm) | | Glass material | Distance (mm) |
| --- | --- | --- | --- | --- |
| | Rm | Rs | Glass | D |
| polygon surface 5a | ∞ | | — | 58.7 |
| synchro-detecting element 7 R1 surface | 62.564 | | PMMA | 7.0 |
| R2 surface | ∞ | −28.707 | — | 124.3 |
| surface of slit 71 (synchro detection position) | ∞ | | — | |
| focal lengths (mm) | | | | |
| scanning optical element | fsc | | | 189.08 |
| synchro-detecting element | fbd | | | 128.75 |
| ratio of focal lengths | fra | | | 0.681 |
| parameters | | | | |
| spacing between adjacent laser emission points | L | | | 0.050 |
| laser exit Fno | Fmi | | | 6 |
| scanned surface entrance Fno | Fme | | | 40 |
| lateral magnification in main scan | m | | | 6.667 |
| spacing between spots (on scanned surface) | mL | | | 0.333 |
| spacing between spots (at synchro position) | mLfra | | | 0.227 |

In the present embodiment the BD lens 7 singly molded of a plastic material is placed in the synchronism detection beams (BD beams) 73. The focal length $f_{BD}$ of the BD lens 7 in the main scanning direction is as follows.

$$f_{BD} = 128.75 \text{ mm}$$

On the other hand, the total focal length $f_{SC}$ of the toric lens 61 and the long diffracting optical element 62 forming the scanning optical element 6 in the main scanning direction is as follows.

$$f_{SC} = 189.08 \text{ mm}$$

Therefore, the ratio of the above focal length $f_{BD}$ of the BD lens 7 to the total focal length $f_{SC}$ is obtained as follows.

$$f_{BD}/f_{SC} = 0.681$$

This satisfies the above conditions (1) and (2).

This optical layout separates the two spots at the synchronism detection position (at the position of the BD slit) by 0.227 mm in the main scanning direction, so that the two spots do not overlap spatially with each other. With the BD optical system 13, it became feasible to decrease the distance from the BD lens 7 to the synchronism detection position by the length approximately equal to the focal length (about 59 mm).

Since in the present embodiment the BD optical system 13 is constructed in the reflective deflection plane of the polygon mirror 5, there is no need for complex mechanical structure for inclination of the BD slit 71 or the like and it further becomes feasible to prevent occurrence of jitter in the main scanning direction between the beams in the multi-beam scanning optical apparatus.

Therefore, the present embodiment accomplishes both the high-accuracy synchronism detection of the multiple beams and the compactification of the BD optical system 13 by setting the ratio of the focal lengths $f_{BD}$, $f_{SC}$ of the BD lens 7 and the scanning optical element 6 of the multi-beam scanning optical apparatus in the main scanning direction to the appropriate value, i.e., by setting the spot spacing S2 between the adjacent spots on the surface of the BD slit 71 so as to be smaller than the spot spacing S1 between the adjacent beams on the photosensitive drum surface 8 while satisfying Condition (2) as described above.

In the present embodiment the scanning optical element 6 is constructed of the refracting optical element 61 and the diffracting optical element 62, but, without having to be limited to this, the scanning optical element 6 can also be constructed of only the refracting optical element and with equivalent effect. In the present embodiment the number of light emission points of the light source means is two, but the present invention can also be applied to the multi-beam semiconductor laser with three or more light emission points.

In the present invention the two light emission points a and b located with the spacing in the main scanning direction, but the two light emission points a and b may be placed with or without spacing in the sub-scanning direction. For example, FIG. 1B depicts light emission points a and b being located with a spacing in both the main scanning direction and the sub-scanning direction.

Next, an image forming apparatus according to the present invention will be described hereinafter.

Figure 8:
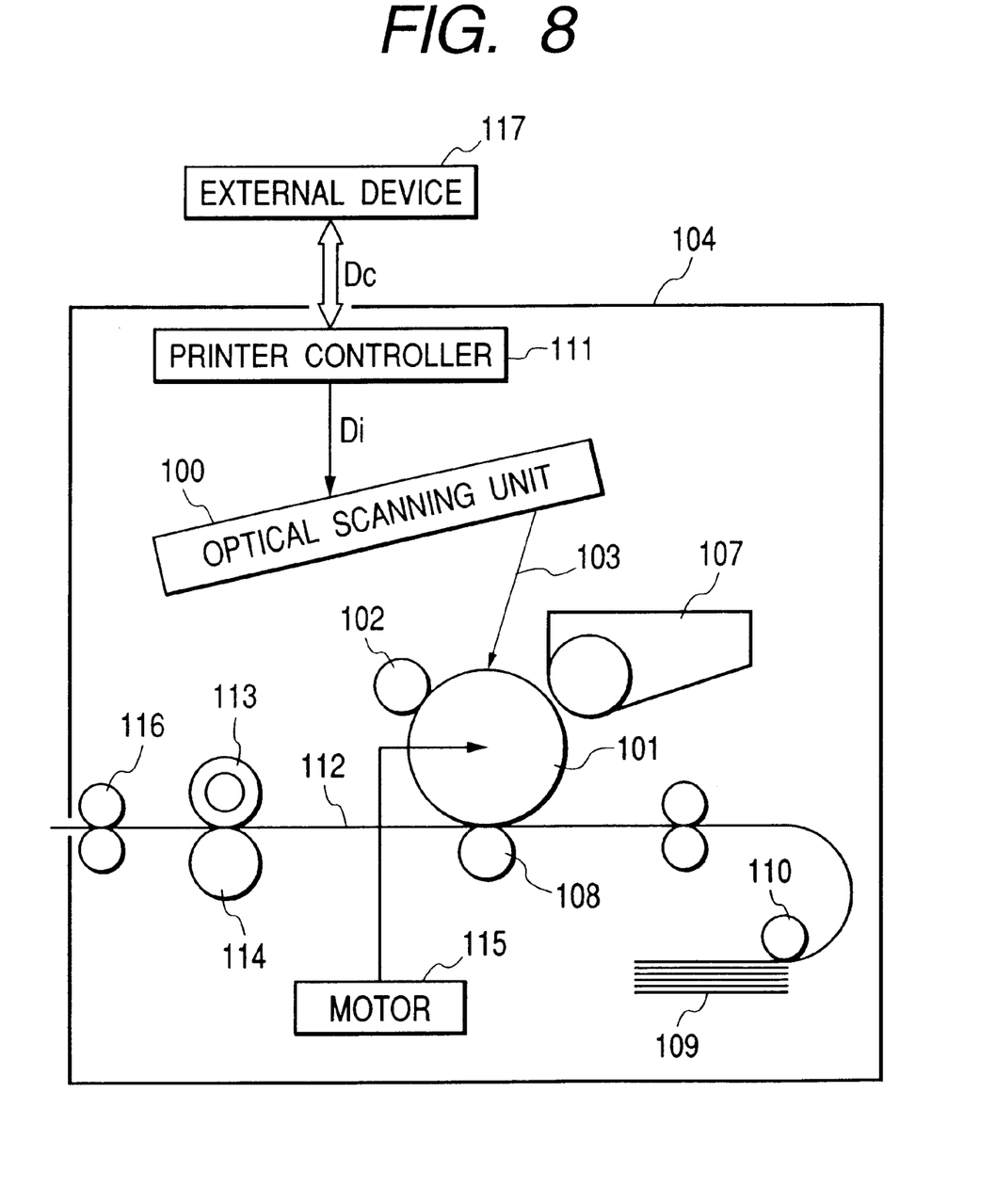
FIG. 8 is a schematic diagram of an image forming apparatus of the present invention.

FIG. 8 is a principal, cross-sectional view in the sub-scanning direction to show an embodiment of the image forming apparatus of the present invention. In FIG. 8, numeral 104 designates the image forming apparatus. Code data Dc is supplied from an external device 117 such as a personal computer or the like to the image forming apparatus 104. This code data Dc is converted into image data (dot data) Di by a printer controller 111 in the apparatus. This image data Di is entered into an optical scanning unit 100 having either of the structures described in Embodiments 1 to 3. This optical scanning unit 100 emits light beams 103 modulated according to the image data Di and the light beams 103 scan a photosensitive surface of photosensitive drum 101 in the main scanning direction.

The photosensitive drum 101 being an electrostatic latent image carrier (photosensitive body) is rotated clockwise by a motor 115. With rotation of the drum, the photosensitive surface of the photosensitive drum 101 moves in the sub-scanning direction perpendicular to the main scanning direction, relative to the light beams 103. A charging roller 102 for uniformly charging the surface of the photosensitive drum 101 is disposed in contact with the surface above the photosensitive drum 101. The light beams 103 under scanning from the optical scanning unit 100 illuminate the surface of the photosensitive drum 101 charged by the charging roller 102.

As described previously, the light beams 103 are modulated based on the image data Di and an electrostatic latent image is formed on the surface of the photosensitive drum 101 by the illumination with the light beams 103. This electrostatic latent image is developed into a toner image by a developing unit 107 disposed in contact with the photosensitive drum 101 located more downstream in the rotating direction of the photosensitive drum 101 than the illumination position of the light beams 103.

The toner image developed by the developing unit 107 is transferred onto a sheet 112 as a transfer medium by a transfer roller 108 disposed opposite to the photosensitive drum 101 and below the photosensitive drum 101. Sheets 112 are stored in a sheet cassette 109 in front (or on the right side in FIG. 8) of the photosensitive drum 101, but a sheet can also be fed by manual feed at the option of the operator. A sheet feed roller 110 is provided at an end of the sheet cassette 109 and feeds the sheet 112 in the sheet cassette 109 into a carry path.

The sheet 112 with the not-yet-fixed toner image thus transferred is further carried to a fixing unit behind the photosensitive drum 101 (or on the left side in FIG. 8). The fixing unit is composed of a fixing roller 113 having a fixing heater (not illustrated) inside and a pressing roller 114 disposed in press contact with the fixing roller 113 and fixes the unfixed toner image on the sheet 112 by heating while pressing it at the nip part between the fixing roller 113 and the pressing roller 114. Sheet discharge rollers 116 are provided further behind the fixing roller 113 and discharge the fixed sheet 112 to the outside of the image forming apparatus.

Although not illustrated in FIG. 8, the print controller 111 performs control of each part in the image forming apparatus including the motor 115 and control of the polygon motor etc. in the optical scanning unit described hereinafter, in addition to the aforementioned conversion of the data.

Embodiment 2

Figure 2:
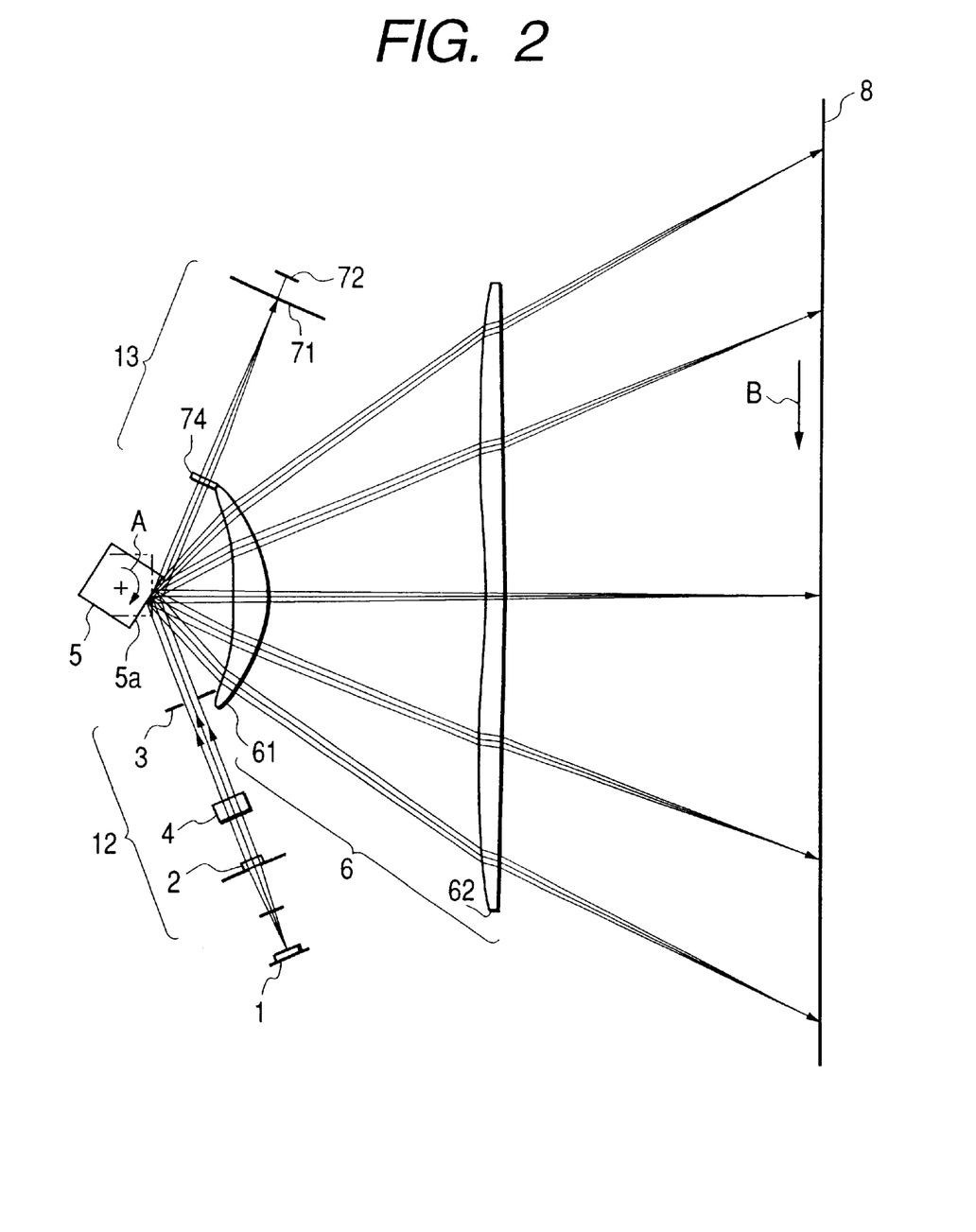
FIG. 2 is a cross-sectional view of Embodiment 2 of the present invention in the main scanning direction.

FIG. 2 is a principal, cross-sectional view in the main scanning direction of Embodiment 2 (main scanning section) where the multi-beam optical scanning apparatus of the present invention is applied to the image forming apparatus such as the laser beam printer, the digital copier, or the like. In FIG. 2 the same elements as those in FIG. 1 are denoted by the same reference symbols.

The present embodiment is different from aforementioned Embodiment 1 in that the BD lens (synchronism-detecting optical element) 74 and the toric lens 61 forming an element of the scanning optical element 6 are integrally molded of a plastic material and in that the focal length of the BD lens 74 is further shortened in the main scanning direction, thereby realizing further compactification of the BD optical system 13. The other structure and optical action are approximately similar to those in Embodiment 1, thereby achieving similar effect.

Namely, in the present embodiment the BD lens 74 and the toric lens 61 constituting one element of the scanning optical element 6 are integrally molded of the plastic material, so as to simplify the entire apparatus.

Table 2 presents set values of the optical layout of the BD optical system 13 in the present embodiment.

TABLE 2

| Setup of BD optical system | Radius of curvature (mm) | | Glass material | Distance (mm) |
|---|---|---|---|---|
| | Rm | Rs | Glass | D |
| polygon surface | ∞ | — | | 45.0 |
| synchro-detecting element R1 surface | 35.552 | | PMMA | 3.0 |
| R2 surface | ∞ | −21.683 | — | 71.3 |
| surface of slit (synchro detection position) | ∞ | | — | |
| focal lengths (mm) | | | | |
| scanning optical element | fsc | | | 189.08 |
| synchro-detecting element | fbd | | | 73.159 |
| ratio of focal lengths | fra | | | 0.387 |
| parameters | | | | |
| spacing between adjacent laser emission points | L | | | 0.090 |
| laser exit Fno | Fmi | | | 6 |
| scanned surface entrance Fno | Fme | | | 40 |
| lateral magnification in main scan | m | | | 6.667 |
| spacing between spots (on scanned surface) | mL | | | 0.600 |
| spacing between spots (at synchro position) | mLfra | | | 0.232 |

In the present embodiment the focal length of the BD lens 74 of the BD optical system 13 in the main scanning direction is as follows.

$f_{BD}=73.159$ mm

On the other hand, the total focal length $f_{SC}$ of the toric lens 61 and the long diffracting optical element 62 forming the scanning optical element 6 in the main scanning direction is as follows.

$f_{SC}=189.08$ mm

Thus, the ratio of the focal length $f_{BD}$ of the BD lens 74 to the total focal length is calculated as follows.

$f_{BD}/f_{SC}=0.387$

This satisfies Conditions (1) and (2).

In the present embodiment, similar to Embodiment 1, the two spots at the synchronism detection position (slit position) are spaced away from each other by 0.232 mm in the main scanning direction, so that they do not overlap spatially with each other. Since the focal length of the BD lens 74 is shorter than in Embodiment 1, the present embodiment realizes further compactification of the BD optical system 13.

Therefore, the present embodiment realizes both the high-accuracy synchronism detection of the multiple beams and the further compactification of the BD optical system 13 by setting the ratio of the focal lengths $f_{BD}$, $f_{SC}$ of the BD lens 74 and the scanning optical element 6 in the main scanning direction to the appropriate value as described above.

Embodiment 3

Figure 3:
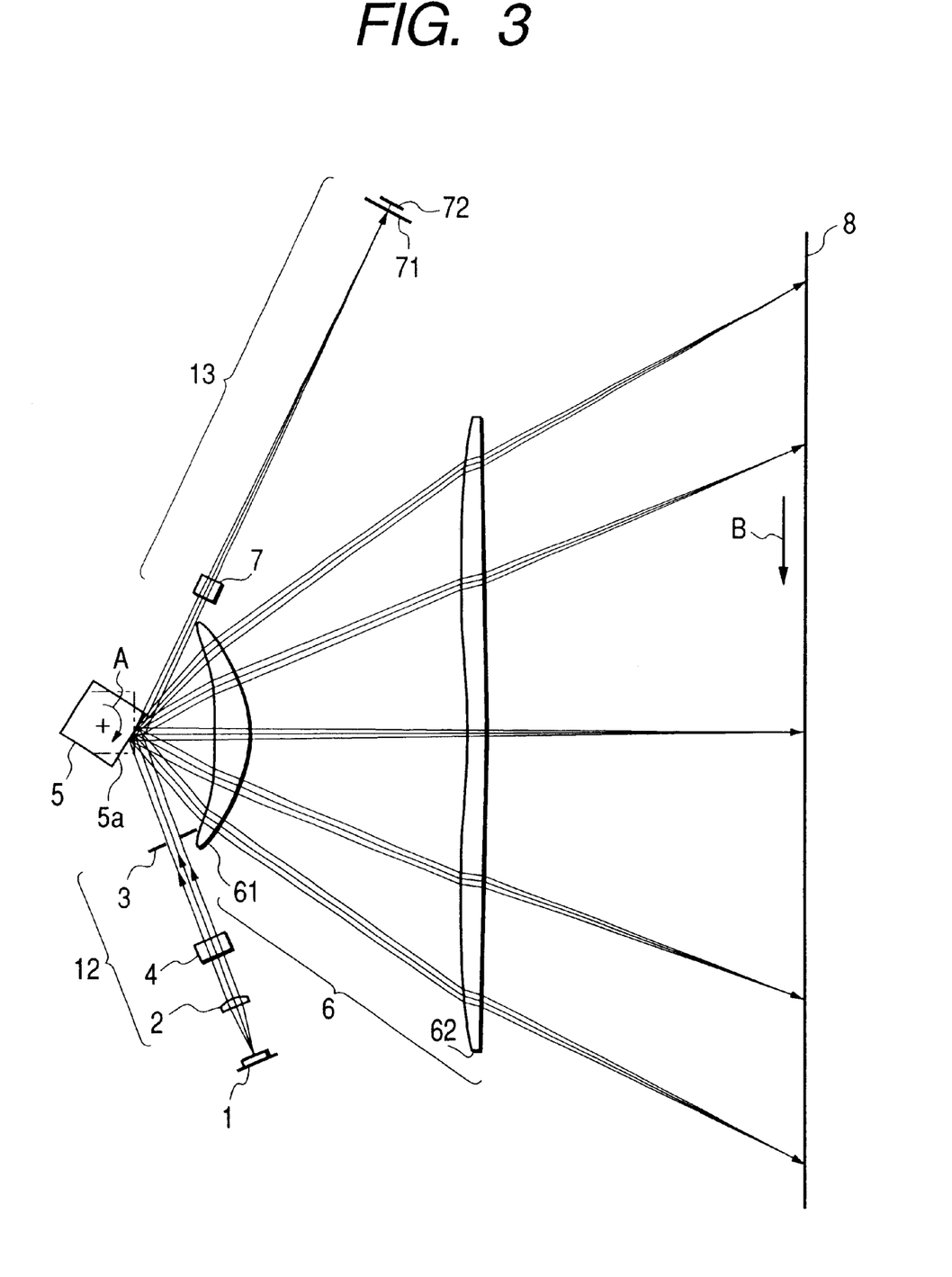
FIG. 3 is a cross-sectional view of Embodiment 3 of the present invention in the main scanning direction.

FIG. 3 is a principal, cross-sectional view of Embodiment 3 in the main scanning direction (main scanning section) where the multi-beam scanning optical apparatus of the present invention is applied to the image forming apparatus such as the laser beam printer, the digital copier, or the like. In FIG. 3 the same elements as those in FIG. 1 are denoted by the same reference symbols.

The present embodiment is different from aforementioned Embodiment 1 in that the distance L of the spacing between the light emission points of the multi-beam semiconductor laser 1 is set shorter, $F_{NO}$ of the beams emitted from the multi-beam semiconductor laser 1 is set brighter in the main scanning direction, and the lateral magnification is set larger in the main scanning direction of the scanning optical apparatus. The other structure and optical action are approximately similar to those in Embodiment 1, thereby achieving similar effect.

Namely, when the distance L between the light emission points of the multi-beam semiconductor laser 1 is set shorter than in Embodiment 1, it is necessary to set the exit $F_{NO}$ of the multi-beam semiconductor laser 1 brighter and to increase the lateral magnification of the scanning optical apparatus in the main scanning direction in order to prevent the spatial overlap between spots, as in the present embodiment. The exit $F_{NO}$ necessary at this time is calculated from a spot profile.

Figure 4:
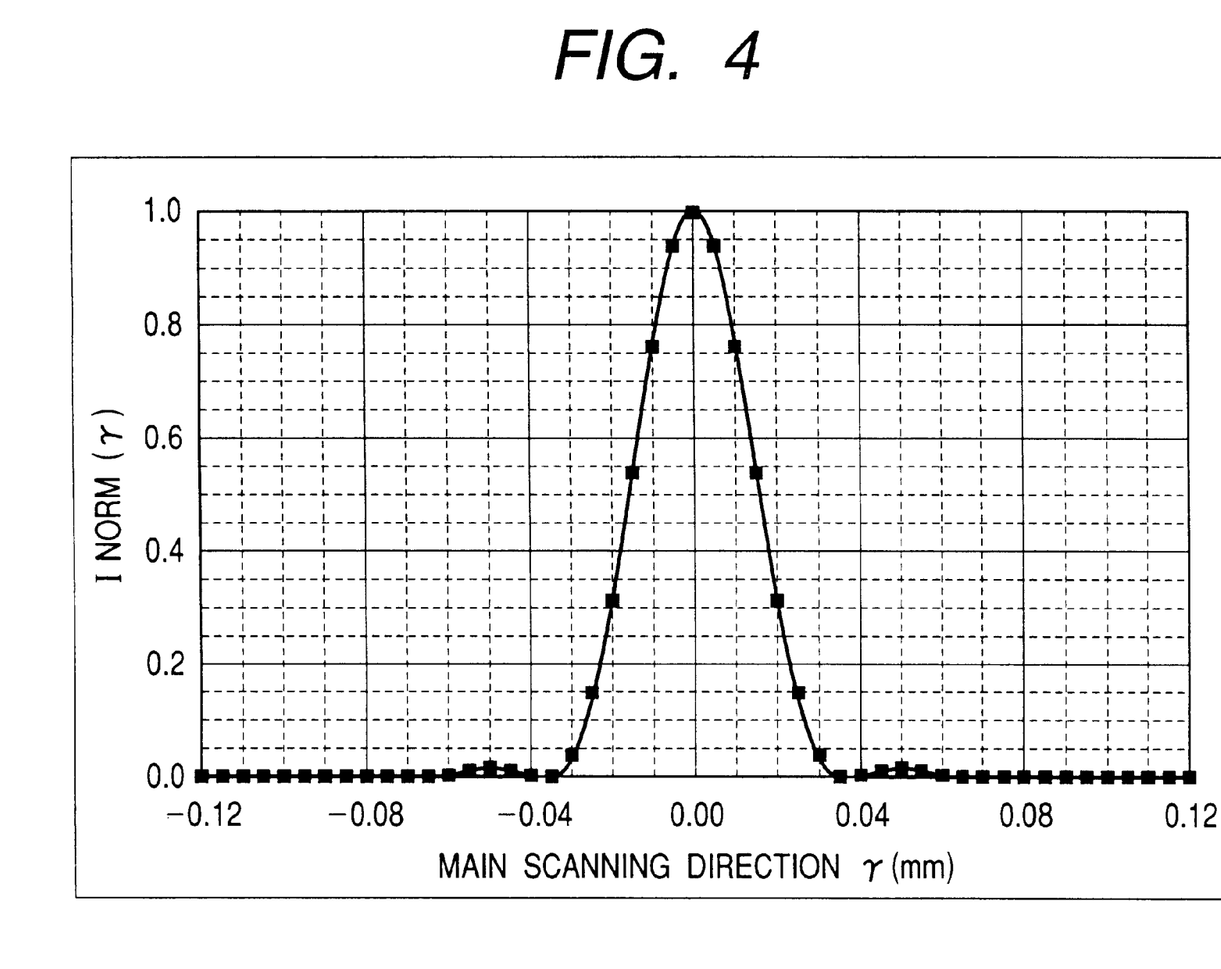
FIG. 4 is a diagram to show an intensity distribution of a Fraunhofer diffraction image of a circular aperture.

It is generally known that the spot profile of the scanning optical apparatus is a Fraunhofer diffraction image of the aperture stop 3 of the incidence optical system. FIG. 4 shows an intensity distribution of a diffraction image where the aperture (stop) is circular. As illustrated in FIG. 4, the intensity distribution has a main lobe in the central part and a side lobe surrounding it and it is seen that there exist points with the intensity of 0 (a dark ring of Airy disk) between them. The position and intensity of dark and bright rings are analytically given as in Table 3 below.

TABLE 3

| Center of spot | Position 0 | Intensity 1 |
|---|---|---|
| first dark ring | 1.220λ$F_{me}$ | 0 |
| first light ring | 1.635λ$F_{me}$ | 0.0175 |
| second dark ring | 2.233λ$F_{me}$ | 0 |
| second light ring | 2.679λ$F_{me}$ | 0.0042 |
| third dark ring | 3.328λ$F_{me}$ | 0 |
| third light ring | 3.699λ$F_{me}$ | 0.0016 |

λ: oscillation wavelength
$F_{me}$: entrance $F_{NO}$ to surface to be scanned

Since the intensity is not more than 0.2%, the rings after the third bright ring are ignored in Table 3. Then the condition for preventing the spatial overlap between spots is set to that the third dark rings of adjacent spots do not overlap with each other.

This condition leads to the following.

$$m \cdot L \cdot f_{BD}/f_{SC} > 2 \times 3.328 \cdot \lambda \cdot F_{me}(F_{me}/F_{mi}) \times L \times f_{BD}/f_{SC} > 6.656 \cdot \lambda \cdot F_{me}F_{mi} < L/(6.656 \cdot \lambda) \times f_{BD}/f_{SC} \quad (3)$$

In the above condition, $F_{mi}$: exit $F_{NO}$ in the main scanning direction of the beams emitted from the multi-beam semiconductor laser. The exit $F_{NO}$ of the multi-beam semiconductor laser 1 needs to be selected so as to satisfy the above condition.

In order to achieve the compactification of the BD optical system 13 at the same time, it is also necessary to satisfy the following.

$f_{BD}/f_{SC}<1.0$

Table 4 presents set values of the optical layout of the BD optical system 13 in the present embodiment.

TABLE 4

| Setup of BD optical system | Radius of curvature (mm) | | Glass material | Distance (mm) |
|---|---|---|---|---|
| | Rm | Rs | Glass | D |
| polygon surface | ∞ | | — | 58.7 |
| synchro-detecting element R1 surface | 72.240 | | PMMA | 7.0 |
| R2 surface | ∞ | −28.989 | — | 143.3 |
| surface of slit (synchro detection position) | ∞ | | — | |
| focal lengths (mm) | | | | |
| scanning optical element | fsc | | | 189.08 |
| synchro-detecting element | fbd | | | 148.66 |
| ratio of focal lengths | fra | | | 0.786 |
| parameters | | | | |
| spacing between adjacent laser emission points | L | | | 0.030 |
| laser exit Fno | Fmi | | | 4.5 |
| scanned surface entrance Fno | Fme | | | 40 |
| lateral magnification in main scan | m | | | 8.889 |
| spacing between spots (on scanned surface) | mL | | | 0.267 |
| spacing between spots (at synchro position) | mLfra | | | 0.210 |

In the present embodiment the spacing L between the light emission points in the main scanning direction of the multi-beam semiconductor laser 1 is 30 μm and the oscillation wavelength of the multi-beam semiconductor laser 1 is 780 nm. From the above equation, the following condition needs to be satisfied in order to prevent the spatial overlap between spots at the synchronism detection position (or at the position of the BD slit).

$$F_{mi} < L/(6.656 \cdot \lambda) \times f_{BD}/f_{SC}$$

$$F_{mi} < 4.54$$

It is thus necessary that the exit $F_{NO}$ of the beams emitted from the multi-beam semiconductor laser 1 be set brighter than 4.54.

Figure 5A:
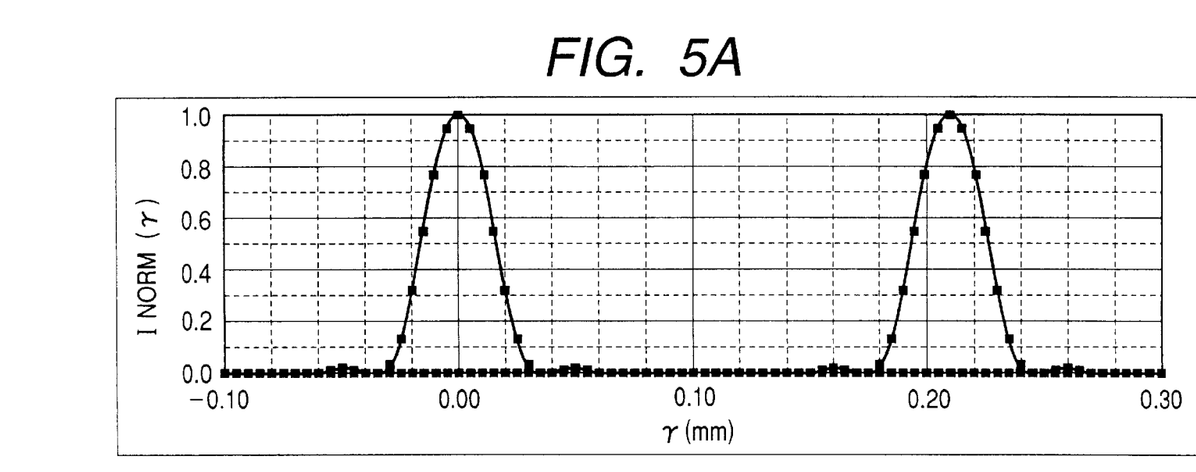
FIG. 5A is a diagram to show separation of spots at the synchronism detection position in Embodiment 3 of the present invention.
Figure 5B:
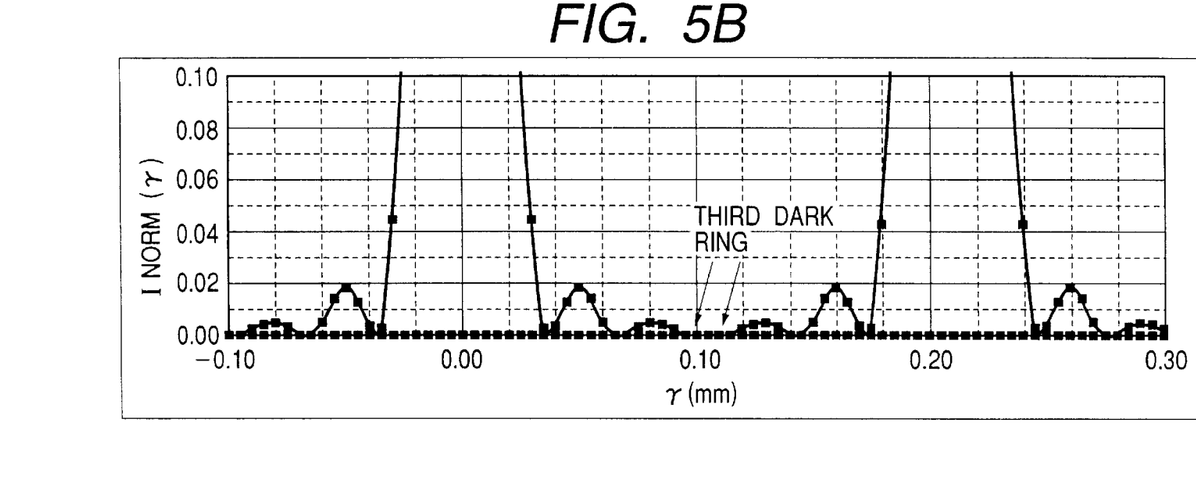
FIG. 5B is an enlarged view thereof.

In the present embodiment the two spots at the synchronism detection position are spaced apart from each other by 0.210 mm in the main scanning direction by setting the exit $F_{NO}$ in the main scanning direction of the beams emitted from the multi-beam semiconductor laser 1 to 4.5, and this permits the spatial separation of the spots. FIGS. 5A and 5B show the state of separation of the spots at the synchronism detection position. It is apparent from these figures that the spots are separated without spatial overlap up to the third dark rings of their spot profiles. Further, the compactification of the BD optical system 13 is also realized at the same time by setting the ratio of the focal lengths $f_{BD}$, $f_{SC}$ in the main scanning direction of the BD lens 7 and the scanning optical element 6 to the following value:

$$f_{BD}/f_{SC} = 0.786.$$

As described above, the present embodiment can also accomplish both the high-accuracy synchronism detection of multiple beams and the further compactification of the BD optical system 13 by setting the ratio of the focal lengths $f_{BD}$, $f_{SC}$ in the main scanning direction of the BD lens 7 and the scanning optical element 6 and the exit $F_{NO}$ of the beams emitted from the multi-beam semiconductor laser 1 to their respective, appropriate values, particularly, in the case where the spacing between adjacent light emission points of the multi-beam semiconductor laser 1 is small in the main scanning direction.

In each of the embodiments the BD optical system 13 is located in the opposite area to the first optical system 12 with respect to the optical axis of the scanning optical element 6, but they may also be located in the same area. In this case the BD lens (synchronism-detecting optical element) and the cylindrical lens as the second optical element may also be integrally formed by plastic injection molding.

According to the present invention, the ratio of the focal lengths in the main scanning direction of the optical element is set to the appropriate value as described above, thereby accomplishing the multi-beam scanning optical apparatus capable of realizing the compactification of the synchronism-detecting optical system and the high-accuracy synchronism detection based on the prevention of spatial overlap of spots and the image forming apparatus using it.

According to the present invention, $F_{NO}$ of the beams emitted from the multi-beam semiconductor laser is set to the appropriate value while keeping the focal length of the synchronism-detecting optical element shorter than the focal length of the scanning optical element in the main scanning direction as described above, whereby the adjacent spots at the synchronism detection position can be spatially separated from each other up to their third dark rings and whereby the synchronism detection accuracy can be improved more while maintaining the compactness of the BD optical system; these achieve the multi-beam scanning optical apparatus capable of performing high-accuracy printing with less jitter by the easy method and the image forming apparatus using it.

What is claimed is:

1. A multi-beam scanning optical apparatus comprising:
    a light source having a plurality of light emission points which emit a plurality of beams capable of being independently optically modulated and which are placed with a spacing in a main-scanning direction;
    a deflecting element for reflectively deflecting the plurality of beams emitted from said light source;
    a scanning optical element for focusing each of the plurality of beams deflected by said deflecting element in a spot shape on a surface to be scanned, the plurality of beams scanning an area on the surface to be scanned; and
    a synchronism detector for controlling timing of a scan start position on the surface to be scanned for each of the plurality of beams based on a signal from a synchronism detecting element,
    wherein part of the plurality of beams are converged in a spot shape at a synchronism detection position and thereafter guided onto a surface of the synchronism detecting element, and
    wherein a first spot spacing in the main-scanning direction between adjacent beams at the synchronism detection position is smaller than a second spot spacing in the main-scanning direction between adjacent beams on the surface to be scanned.

2. A multi-beam scanning optical apparatus comprising:
    a light source having a plurality of light emission points which emit a plurality of beams capable of being independently optically modulated and which are placed with a spacing in a main-scanning direction;
    a deflecting element for reflectively deflecting the plurality of beams emitted from said light source, into the main-scanning direction;
    a scanning optical element for focusing the plurality of beams deflected by said deflecting element onto a surface to be scanned; and a synchronism detector for guiding part of the plurality of beams deflected by said deflecting element, via a synchronism-detecting optical element onto a surface of a synchronism detecting element and controlling timing of a scan start position on the surface to be scanned, based on a signal from the synchronism detecting element, wherein the following condition is satisfied:

$$0.02 \text{ (mm)}/L < f_{BD}/f_{SC} < 1.0,$$

where L is a distance in the main-scanning direction between adjacent light emission points of said light source, $f_{SC}$ is a focal length in the main-scanning direction of said scanning optical element, and $f_{BD}$ is a focal length in the main-scanning direction of the synchronism-detecting optical element.

3. The multi-beam scanning optical apparatus according to claim 2, wherein said synchronism detector controls the timing of the scan start position on the surface to be scanned for each of the plurality of beams emitted from said light source.

4. The multi-beam scanning optical apparatus according to claim 2, wherein the synchronism-detecting optical element is an anamorphic lens.

5. The multi-beam scanning optical apparatus according to claim 2, wherein the synchronism-detecting optical element is made of a plastic material.

6. The multi-beam scanning optical apparatus according to claim 2, wherein said scanning optical element is made of a plastic material.

7. The multi-beam scanning optical apparatus according to claim 2, wherein the synchronism-detecting optical element and at least one optical element forming said scanning optical element are integrally molded by plastic injection molding.

8. The multi-beam scanning optical apparatus according to claim 2, further comprising a second optical element for guiding the plurality of beams emitted from said light source toward said deflecting element, wherein the synchronism-detecting optical element and said second optical element are integrally molded by plastic injection molding.

9. The multi-beam scanning optical apparatus according to claim 2, wherein said scanning optical element comprises a refracting optical element and a diffracting optical element.

10. The multi-beam scanning optical apparatus according to claim 2, wherein said synchronism detector is constructed in a plane of reflective deflection effected by said deflecting element.

11. An image forming apparatus comprising:
said scanning optical apparatus as set forth in any one of claims 1 to 10; and
a printer controller for converting code data supplied from an external device into an image signal and entering the image signal into said scanning optical apparatus.

12. A multi-beam scanning optical apparatus comprising:
a light source having a plurality of light emission points which emit a plurality of beams capable of being independently optically modulated and which are placed with a spacing in a main-scanning direction;
a deflecting element for reflectively deflecting the plurality of beams emitted from said light source, into the main-scanning direction;
a scanning optical element for focusing the plurality of beams deflected by said deflecting element, onto a surface to be scanned; and
a synchronism detector for guiding part of the plurality of beams deflected by said deflecting element, via a synchronism-detecting optical element onto a surface of a synchronism detecting element and controlling timing of a scan start position on the surface to be scanned, based on a signal from the synchronism detecting element, wherein the following condition is satisfied:

$$f_{BD}/f_{SC} < 1.0,$$

where $f_{SC}$ is a focal length in the main-scanning direction of said scanning optical element and $f_{BD}$ is a focal length in the main-scanning direction of the synchronism-detecting optical element, and wherein the following condition is also satisfied:

$$Fmi < L/(6.656 \times \lambda) \times f_{BD}/f_{SC},$$

where L is a distance in the main-scanning direction between adjacent light emission points of said light source, $\lambda$ is an oscillation wavelength of said light source, and Fmi is an exit F number in the main-scanning direction of the plurality of beams emitted from said light source.

13. The multi-beam scanning optical apparatus according to claim 12, wherein said synchronism detector controls the timing of the scan start position on the surface to be scanned for each of the plurality of beams emitted from said light source.

14. The multi-beam scanning optical apparatus according to claim 12, wherein the synchronism-detecting optical element is an anamorphic lens.

15. The multi-beam scanning optical apparatus according to claim 12, wherein the synchronism-detecting optical element is made of a plastic material.

16. The multi-beam scanning optical apparatus according to claim 12, wherein said scanning optical element is made of a plastic material.

17. The multi-beam scanning optical apparatus according to claim 12, wherein the sychronism-detecting optical element and at least one optical element forming said scanning optical element are integrally molded by plastic injection molding.

18. The multi-beam scanning optical apparatus according to claim 12, further comprising:
a second optical element for guiding the plurality of beams emitted from said light source toward said deflecting element,
wherein the synchronism-detecting optical element and said second optical element are integrally molded by plastic injection molding.

19. The multi-beam scanning optical apparatus according to claim 12, wherein said scanning optical element comprises a refracting optical element and a diffracting optical element.

20. The multi-beam scanning optical apparatus according to claim 12, wherein said synchronism detector is constructed in a plane of reflective deflection effected by said deflecting element.

21. An image forming apparatus comprising:
said scanning optical apparatus as set forth in any one of claims 12 to 20; and
a printer controller for converting code data supplied from an external device into an image signal and entering the image signal into said scanning optical apparatus.

* * * * *

UNITED STATES PATENT AND TRADEMARK OFFICE
CERTIFICATE OF CORRECTION

PATENT NO.    : 6,469,818 B1
DATED         : October 22, 2002
INVENTOR(S)   : Manabu Kato It is certified that error appears in the above-identified patent and that said Letters Patent is hereby corrected as shown below:

Column 12,
Lines 50 to 53, "$m \cdot L \cdot f_{BD}/f_{SC} > 2 \times 3.328 \cdot \lambda \cdot F_{me}\ (F_{me}/F_{mi}) \times L \times f_{BD}/f_{SC} > 6.656 \cdot \lambda \cdot F_{me}\ F_{mi} < L/(6.656 \cdot \lambda) \times f_{BD}/f_{SC}$ (3)"

should read
--$m \cdot L \cdot f_{BD}/f_{SC} > 2 \times 3.328 \cdot \lambda \cdot F_{me}$
$(F_{me}/F_{mi}) \times L \times f_{BD}/f_{SC} > 6.656 \cdot \lambda \cdot F_{me}$
$F_{mi} < L/(6.656 \cdot \lambda) \times f_{BD}/f_{SC}$ (3)--.

Signed and Sealed this

Third Day of June, 2003

JAMES E. ROGAN
*Director of the United States Patent and Trademark Office*